(12) United States Patent
Nakagaki

(10) Patent No.: US 9,990,007 B2
(45) Date of Patent: Jun. 5, 2018

(54) STAND DEVICE AND STAND-EQUIPPED PORTABLE INFORMATION DEVICE

(71) Applicant: LENOVO (SINGAPORE) PTE. LTD., Singapore (SG)

(72) Inventor: Yoshihito Nakagaki, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days. days.

(21) Appl. No.: 15/652,932

(22) Filed: Jul. 18, 2017

(65) Prior Publication Data
US 2018/0052498 A1     Feb. 22, 2018

(30) Foreign Application Priority Data

Aug. 18, 2016  (JP) .................... 2016-160526

(51) Int. Cl.
*G06F 1/16*  (2006.01)
(52) U.S. Cl.
CPC .......... *G06F 1/1681* (2013.01); *G06F 1/1626* (2013.01); *G06F 2200/1631* (2013.01)
(58) Field of Classification Search
CPC ......... G06F 1/16; G06F 1/1601; G06F 1/1681
See application file for complete search history.

(56) References Cited

U.S. PATENT DOCUMENTS

| 5,480,118 | A * | 1/1996 | Cross | B42D 5/043 |
| | | | | 248/174 |
| 8,770,538 | B2 * | 7/2014 | Hsu | G06F 1/1624 |
| | | | | 248/461 |
| 8,976,519 | B2 * | 3/2015 | Lai | G06F 1/1616 |
| | | | | 248/917 |
| 2006/0077622 | A1 * | 4/2006 | Keely | G06F 1/1616 |
| | | | | 361/679.09 |
| 2009/0320244 | A1 * | 12/2009 | Lin | E05D 11/087 |
| | | | | 16/362 |
| 2014/0083883 | A1 * | 3/2014 | Elias | G06F 1/1626 |
| | | | | 206/320 |
| 2014/0321038 | A1 * | 10/2014 | Park | G06F 1/1681 |
| | | | | 361/679.09 |
| 2017/0025036 | A1 * | 1/2017 | Strieby | G06F 1/1607 |
| 2017/0292302 | A1 * | 10/2017 | Tomky | E05D 11/082 |
| 2018/0012691 | A1 * | 1/2018 | Lauder | H01F 7/0205 |

FOREIGN PATENT DOCUMENTS

| JP | 2009158669 A | 7/2009 |
| JP | 2015050554 A | 3/2015 |

* cited by examiner

*Primary Examiner* — Anthony Q Edwards
(74) *Attorney, Agent, or Firm* — Shimokaji IP

(57) ABSTRACT

The present invention provides a stand device that enables a portable information device to be set at a desired upright angle easily and smoothly, and a stand-equipped portable information device including the stand device. The stand device includes: a guide rail facing a back surface of a chassis of the portable information device; and a bendable stand plate having a first end attached to the chassis and a second end opposite to the first end. A slide member disposed at the second end is slidably engaged with the guide rail. The stand plate includes a crease that extends in a direction intersecting the extension direction of the guide rail, and is disposed between the first end and the second end so that when the slide member slides, the stand plate is bent at the crease and is brought into contact with or separated from the back surface of the chassis.

9 Claims, 8 Drawing Sheets

STAND DEVICE AND STAND-EQUIPPED PORTABLE INFORMATION DEVICE

FIELD OF THE INVENTION

The present invention relates to a stand device capable of holding a portable information device in an upright position and a stand-equipped portable information device including the stand device.

BACKGROUND OF THE INVENTION

In recent years, tablet-type personal computers (tablet PCs) including touch-panel liquid crystal displays and no physical keyboards have been rapidly widespread. In general, a tablet PC is operated while being held with a hand in some cases or being placed on a table or the like in other cases. In the case of being operated while being placed on a table or the like, the tablet PC is used in an upright position in which the tablet PC stands with a stand.

For example, Patent Document 1 discloses a portable information device including a stand rotatably provided at the back surface of a chassis with a hinge. Patent Document 2 discloses a configuration that can be used as a stand by folding back a cover covering a portable information device.

CITATION LIST

Patent Documents

[Patent Document 1] Japanese Unexamined Patent Application Publication No. 2009-158669
[Patent Document 2] Japanese Unexamined Patent Application Publication No. 2015-50554

SUMMARY OF THE INVENTION

Problems to be Solved by the Invention

In the configuration described in Patent Document 1, to securely hold the stand in a desired angular position, a hinge having a sufficiently large torque needs to be used. In view of this, in using the stand housed along the back surface of the portable information device, for example, it is necessary for a user to pull the stand by hooking a fingertip or a nail on an edge of the stand with a force greater than a torque set for the hinge. Thus, a user with low grip strength or a short nail, for example, might fail to raise the stand easily and smoothly.

The configuration described in Patent Document 2 needs complex folding of the cover covering the portable information device to configure the stand. Thus, in this configuration, skill is needed for using the stand, and it is not easy to understand how to adjust an upright angle.

The present invention has been made in view of the foregoing problems of the techniques to date, and has an object of providing a stand device that can set a portable information device at a desired upright angle easily and smoothly, and a stand-equipped portable information device including the stand device.

Means for Solving the Problems

A stand device according to an aspect of the present invention is a stand device capable of holding a portable information device in an upright position, and includes: a guide rail facing a back surface of a chassis of the portable information device; and a stand plate having a first end that is attached to the chassis in such a manner that the stand plate is bendable and having a second end opposite to the first end, a slide member being disposed at the second end and being slidably engaged with the guide rail, the stand plate including a crease that extends in a direction intersecting a direction in which the guide rail extends and is disposed between the first end and the second end so that, when the slide member slides along the guide rail, the stand plate is bent at the crease and is brought into contact with or separated from the back surface of the chassis.

With this configuration, the stand plate is bent at the crease, and the slide member is caused to slide along the guide rail to be disposed at a predetermined position so that the portable information device can stand and be held in a predetermined angular position. Thus, it is unnecessary to apply a large torque to the crease of the stand plate or a portion serving as a hinge to the chassis. In addition, a change in the bending angle of the stand plate caused by sliding of the slide member can be easily grasped. As a result, the stand device enables the portable information device to be easily and smoothly set at a desired upright angle.

A plurality of engaging portions capable of being engaged with the slide member for positioning at a predetermined slide position may be provided at a plurality of locations in a longitudinal direction of the guide rail. In this case, the stand plate can be maintained in bent states in which the stand plate is bent at a plurality of angular positions, and the upright angle of the portable information device can be easily adjusted.

When the slide member is disposed at a terminal end of the guide rail corresponding to the second end of the stand plate, the stand plate may be in a planar shape along the back surface of the chassis. In this case, the stand device is integrated with the back surface of the portable information device. Accordingly, in the case of not using the stand device, a user can use the portable information device while easily gripping the portable information device with, for example, a hand without being disturbed by the stand device.

A holding unit capable of holding the slide member may be disposed at the terminal end of the guide rail. In this case, the slide member is held by the holding unit so that backlash and rising of the stand plate in the housing position can be reduced.

The guide rail may include a long hole facing the back surface of the chassis and a rail part which is disposed in the long hole and on which the slide member slides, and the slide member may include a shaft part penetrating the long hole and a slide piece slidably engaged with an edge of the long hole in a state in which the slide piece is slidable on the rail part. In this case, the stand device can be constituted with a simple configuration.

The stand device may further include an attachment plate that is removably attached to the back surface of the chassis of the portable information device, the guide rail may be disposed on the attachment plate, and the first end of the stand plate may be attached to an edge of the attachment plate. In this case, the portable information device can be configured to be removably attached to the stand device. Thus, in a case where the stand device is unnecessary, the stand device can be removed from the portable information device so that convenience can be enhanced.

A stand-equipped portable information device according to an aspect of the present invention includes: the stand device having the configuration described above; and the portable information device.

A stand-equipped portable information device according to an aspect of the present invention includes: the stand device having the configuration described above; and the portable information device, wherein the guide rail faces the back surface of the chassis of the portable information device, and the first end of the stand plate is attached to an edge of the chassis. In this configuration, the stand device is integrally provided with the portable information device so that reduction in size, thickness, and cost of the whole device can be achieved.

A plurality of recesses and a plurality of projections each extending along a direction in which the guide rail extends may be arranged on the back surface of the chassis of the portable information device in a direction orthogonal to the direction in which the guide rail extends, and the guide rail may be disposed along the recesses. In this case, the guide rail can be embedded between the recesses and the projections to be inconspicuous on the back surface of the chassis.

Effects of the Invention

According to an aspect of the present invention, the portable information device can be set at a desired upright angle easily and smoothly.

DETAILED DESCRIPTION OF THE INVENTION

A stand device according to an aspect of the present invention will be described in detail with reference to the attached drawings, using preferred embodiments of an example portable information device including the stand device.

Figure 1:
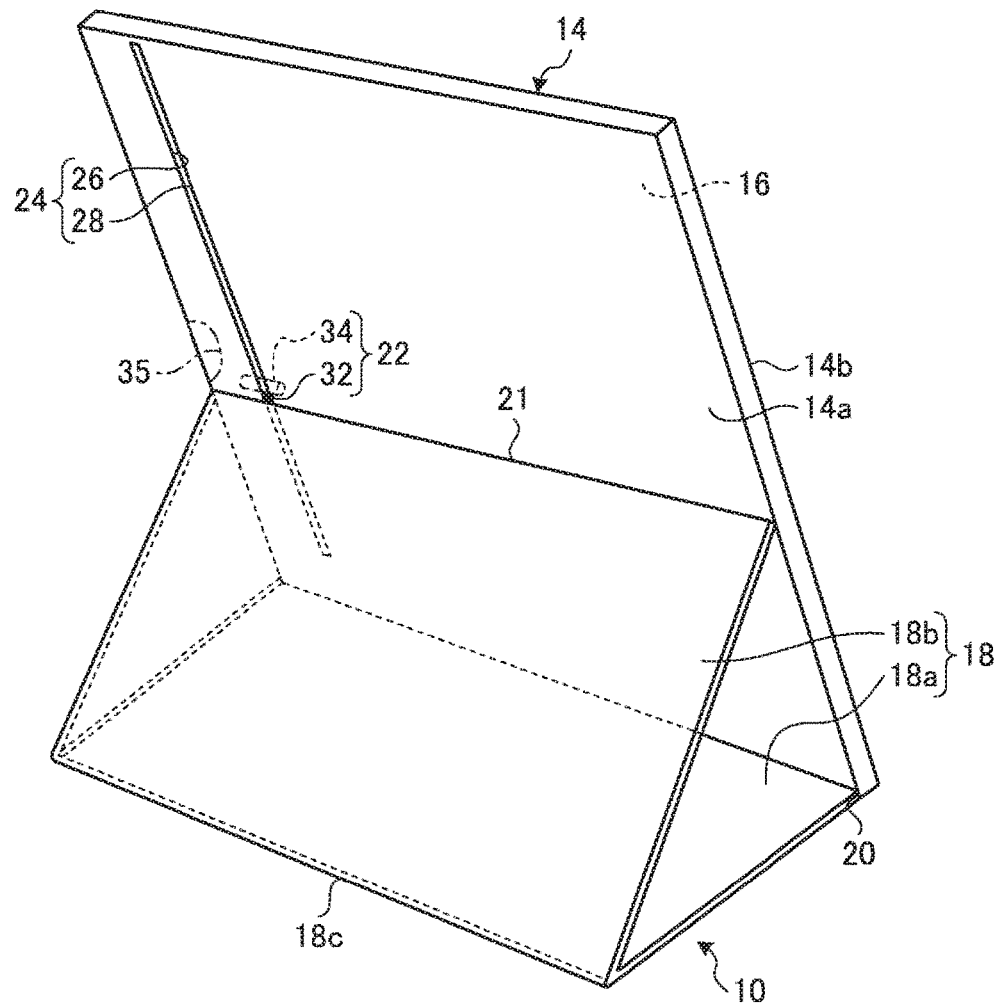
FIG. 1 is a perspective view schematically illustrating a portable information device including a stand device according to an embodiment of the present invention.

FIG. 1 is a perspective view schematically illustrating a portable information device 12 including a stand device 10 according to an embodiment of the present invention, and is a view of the portable information device 12 when viewed from the back.

As illustrated in FIG. 1, the stand device 10 is disposed at a back surface 14a of a chassis 14 of the portable information device 12. The stand device 10 is a device for holding the portable information device 12 in an upright position on a table or the like.

The portable information device 12 is a tablet PC including a display 16 that is a touch panel liquid crystal display unit on a front surface 14b of the chassis 14. The chassis 14 is configured to surround the display 16 at four peripheries and the back surface thereof with a resin cover member formed in a thin box shape. The chassis 14 accommodates various electronic components such as an unillustrated board, an unillustrated computation device, and an unillustrated memory. The portable information device 12 may be various types of electronic devices, such as a smartphone or an electronic organizer, as well as the tablet PC.

The stand device 10 includes a stand plate 18 that can be bent at the back surface 14a of the chassis 14 of the portable information device 12.

The stand plate 18 includes a first plate 18a and a second plate 18b disposed in the vertical direction of the portable information device 12. The first plate 18a and the second plate 18b are coupled to each other so that the plates 18a and 18b can be bent relative to each other at a crease 18c. In the stand plate 18, the first plate 18a and the second plate 18b integrally extend. As a material for the stand plate 18, a thin flat plate of, for example, a glass epoxy resin, polycarbonate, or carbon is used as a core material of each of the first plate 18a and the second plate 18b, and the core material is enclosed with, for example, leather, synthetic leather, or cloth. The crease 18c is constituted by, for example, leather only and includes no core material so that a bendable flexible hinge can be obtained. The crease 18c extends across the width of the stand plate 18 in a direction intersecting (orthogonal to in this embodiment) the direction from the first plate 18a to the second plate 18b (vertical direction of the portable information device 12).

In the stand plate 18, a first end 20 of the first plate 18a opposite to the crease 18c is attached to the bottom of the back surface 14a of the chassis 14. The first end 20 is constituted by a flexible hinge similar to the crease 18c.

In the stand plate 18, a second end 21 of the second plate 18b opposite to the crease 18c is coupled to the back surface 14a of the chassis 14 so that the second end 21 is vertically slidable. The second end 21 is provided with a slide member 22. The slide member 22 is located at a position near to a side of the second end 21 of the second plate 18b (i.e., near the left in FIG. 1 in this embodiment). The slide member 22 is slidably engaged with a guide rail 24 provided on the back surface 14a of the chassis 14. The guide rail 24 extends vertically on the portable information device 12, that is, in the direction from the first end 20 to the second end 21 of the stand plate 18.

Figure 2A:
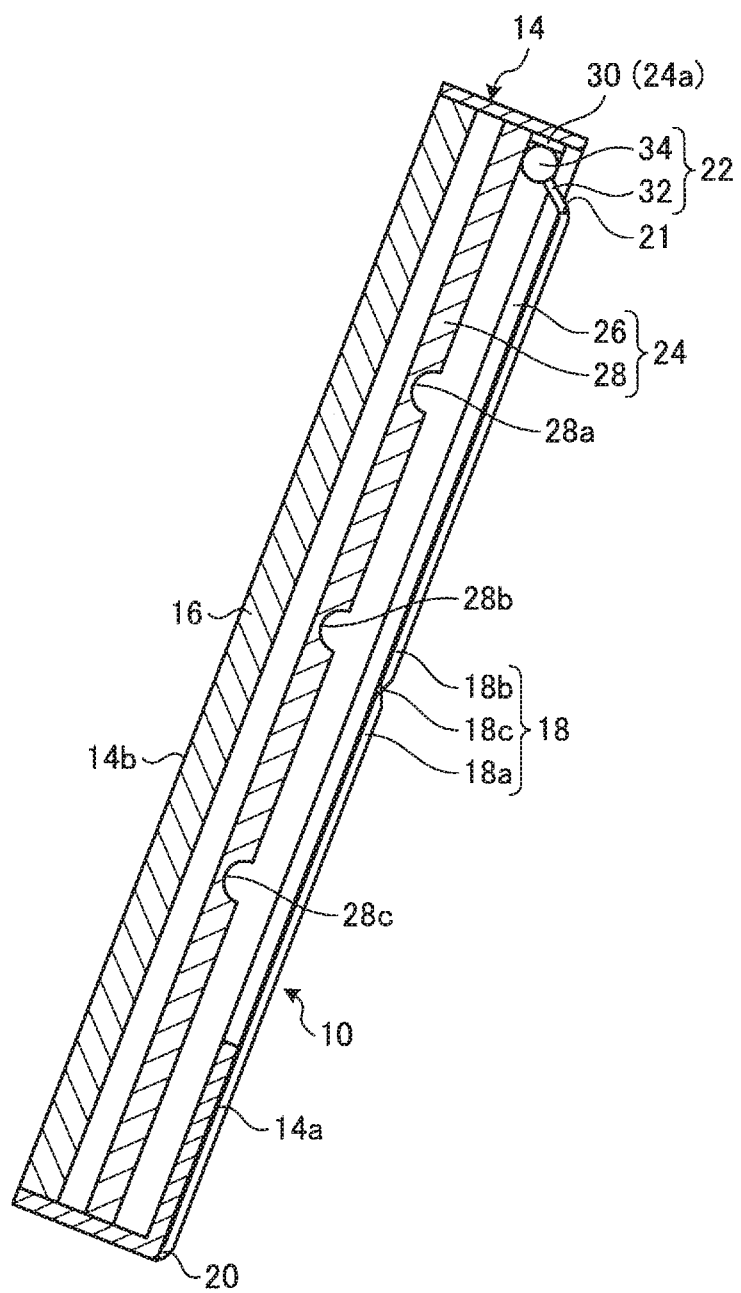
FIG. 2A is a vertical cross-sectional view of the portable information device in a state where the stand device is in a housing position.
Figure 2B:
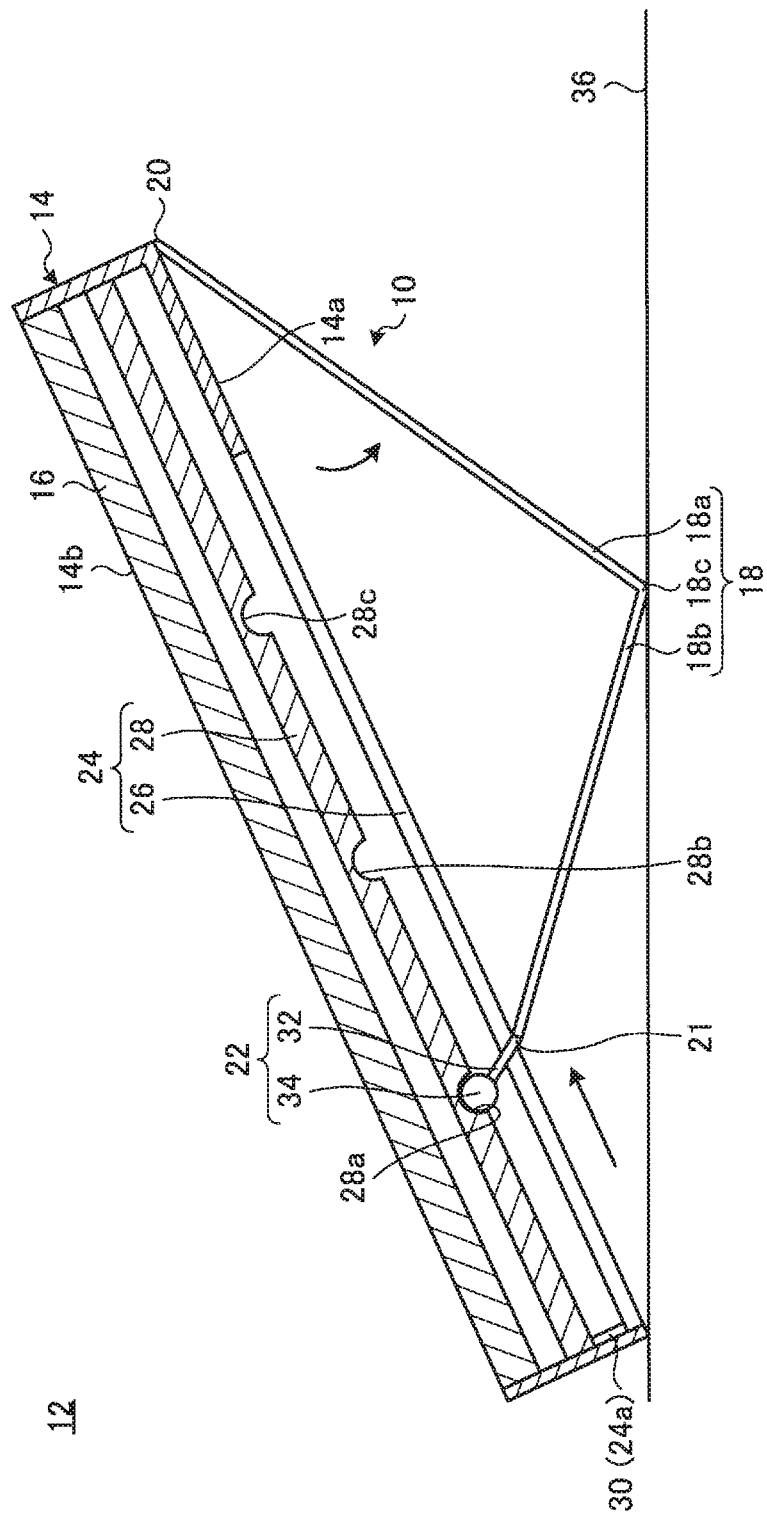
FIG. 2B is a vertical cross-sectional view of the portable information device in a state where the stand device is in an upright position at a predetermined angle.
Figure 2C:
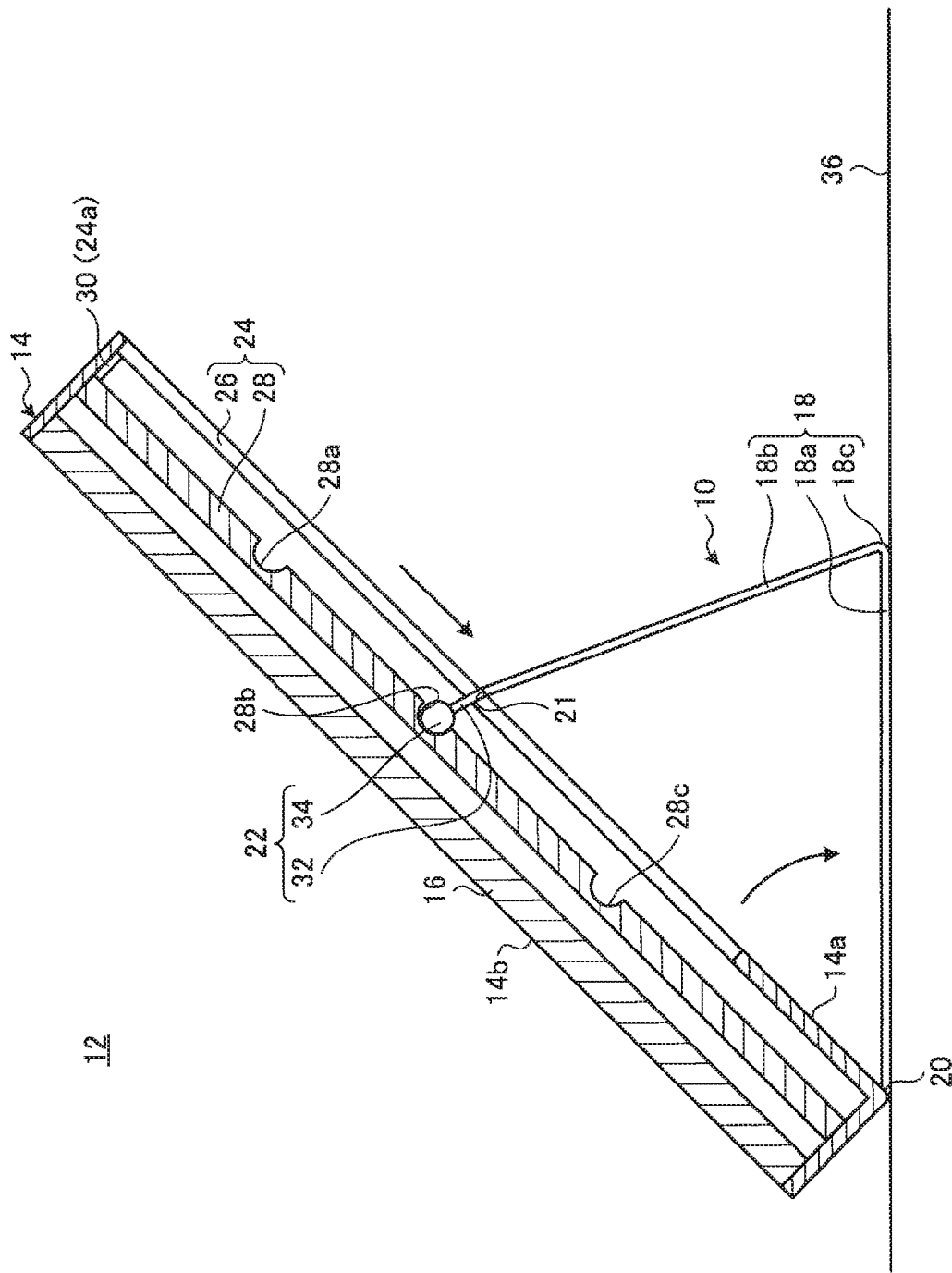
FIG. 2C is a vertical cross-sectional view of the portable information device in a state where the stand device is in an upright position at another predetermined angle.
Figure 3:
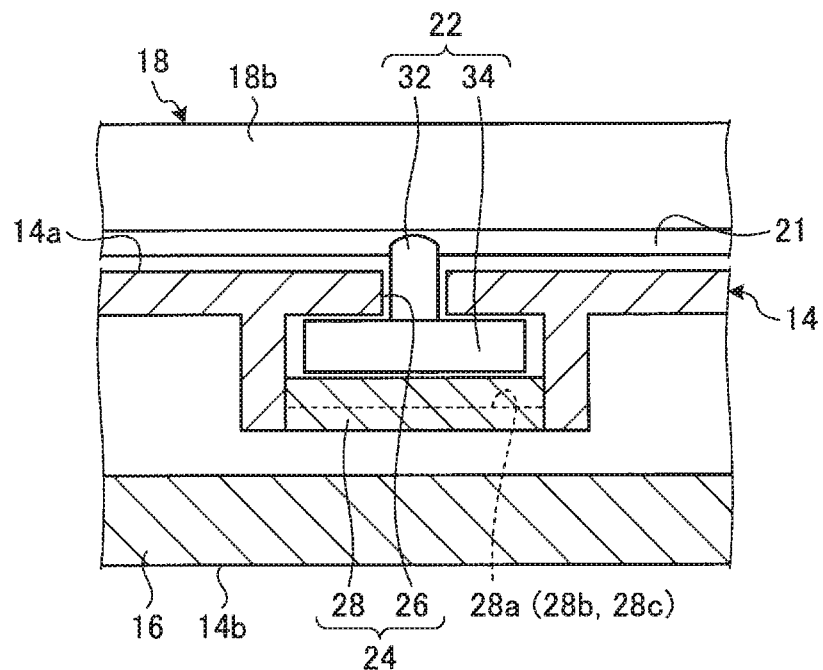
FIG. 3 is a horizontal cross-sectional view illustrating a main portion of the portable information device in an enlarged manner.

FIG. 2A is a vertical cross-sectional view of the portable information device 12 in a state where the stand device 10 is in a housing position. FIGS. 2B through 2C are vertical cross-sectional views of the portable information device 12 in states in which the stand device 10 illustrated in FIG. 2A is in upright positions at respectively predetermined angles. FIG. 3 is a horizontal cross-sectional view illustrating a main portion of the portable information device 12 in an enlarged manner, and shows a relationship between the slide member 22 and the guide rail 24.

As illustrated in FIG. 1 and FIGS. 2A through 2D, the guide rail 24 includes a long hole 26 provided in the back surface 14*a* of the chassis 14 and a rail part 28 disposed inside the long hole 26.

The long hole 26 is a hole having substantially a T shape in cross section whose bottom portion is wider than its opening portion at back surface 14*a* (see FIG. 3).

The rail part 28 is a hard band plate-shaped member made of a resin or a metal and is fixed to the wide bottom portion of the long hole 26. The rail part 28 has a surface serving as a sliding surface of the slide member 22. The rail part 28 is provided with engaging portions 28*a* through 28*c* at a plurality of locations (three locations in FIG. 2A) in its longitudinal direction. The engaging portions 28*a* through 28*c* are recesses that are engaged with the slide member 22 for positioning at a predetermined slide position. At least one of the engaging portions 28*a* through 28*c* may be provided, or four or more such engaging portions may be provided. A holding unit 30 is provided at a terminal end 24*a* of the guide rail 24 located at the second end 21 of the stand plate 18. The holding unit 30 holds a slide member 22 disposed at the terminal end 24*a*. The holding unit 30 is constituted by, for example, a magnet that can attract the slide member 22 or a latch mechanism that can be engaged with and hold the slide member 22.

The slide member 22 includes a shaft part 32 penetrating the long hole 26 and a slide piece 34 disposed at a tip of the shaft part 32, and has a substantially T shape.

The shaft part 32 is a slender pin-like member projecting from the second end 21 of the stand plate 18 (second plate 18*b*). The shaft part 32 penetrates the narrow opening portion of the long hole 26 (see FIG. 3), and is movable along the opening portion.

The slide piece 34 is a pin-like member fixed in a position perpendicular to the tip of the shaft part 32. The slide piece 34 is disposed to be movable along the rail part 28 in the wide bottom portion of the long hole 26. The slide piece 34 is engaged with the edge of the narrow opening portion of the long hole 26 and is stopped from being released from the long hole 26 (see FIG. 3). In this manner, the slide member 22 is engaged with the guide rail 24 so that the slide member 22 is movable along the longitudinal direction of the guide rail 24.

An operation in using the stand device 10 will now be described.

First, as illustrated in FIG. 2A, the stand device 10 is in the housing position in a state where the slide member 22 is positioned at the terminal end 24*a* of the guide rail 24 and held by the holding unit 30. In this housing position, the stand device 10 has a flat shape in which the first plate 18*a* and the second plate 18*b* are flush with each other and the stand plate 18 is disposed along the back surface 14*a* of the chassis 14. Consequently, the stand device 10 is integrated with the back surface 14*a* of the portable information device 12. Thus, a user can use the portable information device 12 while easily gripping the portable information device 12 with, for example, a hand without being disturbed by the stand device 10. In addition, since the slide member 22 is held by the holding unit 30, neither backlash nor rising of the stand plate 18 occurs.

Next, in a case where the stand device 10 in the housing position is changed to an upright position and the portable information device 12 is changed to the upright position, the second plate 18*b* is lifted away from the back surface 14*a*. When the slide member 22 is released from the holding unit 30, the slide member 22 moves along the guide rail 24 from the terminal end 24*a* to the other end with the stand plate 18 being bent with respect to the crease 18*c* to be an inverted-V shape. The chassis 14 may include a finger rest 35 at a position corresponding to a side of the crease 18*c* or a side of the second plate 18*b* of the stand device 10 in the housing position (see FIG. 1). The finger rest 35 is a recess formed in a side peripheral portion of the chassis 14. By engaging a finger with this finger rest 35, the stand plate 18 in the housing position can be smoothly lifted.

For example, as illustrated in FIG. 2B, when the slide member 22 is engaged with the engaging portion 28*a* closest to the terminal end 24*a*, the stand plate 18 is in an upright position forming an inverted-V shape with a gentle peak in which the stand plate 18 is bent at the crease 18*c* at a relatively large angle. At this upright position, the crease 18*c* as a peak of the stand plate 18 and the upper end of the chassis 14 can be placed on a mount surface 36 of, for example, a table, as illustrated in FIG. 2B. In this manner, the portable information device 12 gently stands on the mount surface 36. Accordingly, a user can visually recognize the display 16 or perform a touch operation on the display 16 without gripping the portable information device 12 with a hand.

For example, as illustrated in FIG. 2C, when the slide member 22 is engaged with the adjacent engaging portion 28*b* from the engaging portion 28*a*, the stand plate 18 comes to be in an upright position forming an inverted-V shape in which the stand plate 18 is bent at the crease 18*c* at an angle smaller than that illustrated in FIG. 2B. At this upright position, the first plate 18*a* can be placed on the mount surface 36, as illustrated in FIG. 2C. Accordingly, the portable information device 12 stands on the mount surface 36 more steeply than that illustrated in FIG. 2B.

Figure 2D:
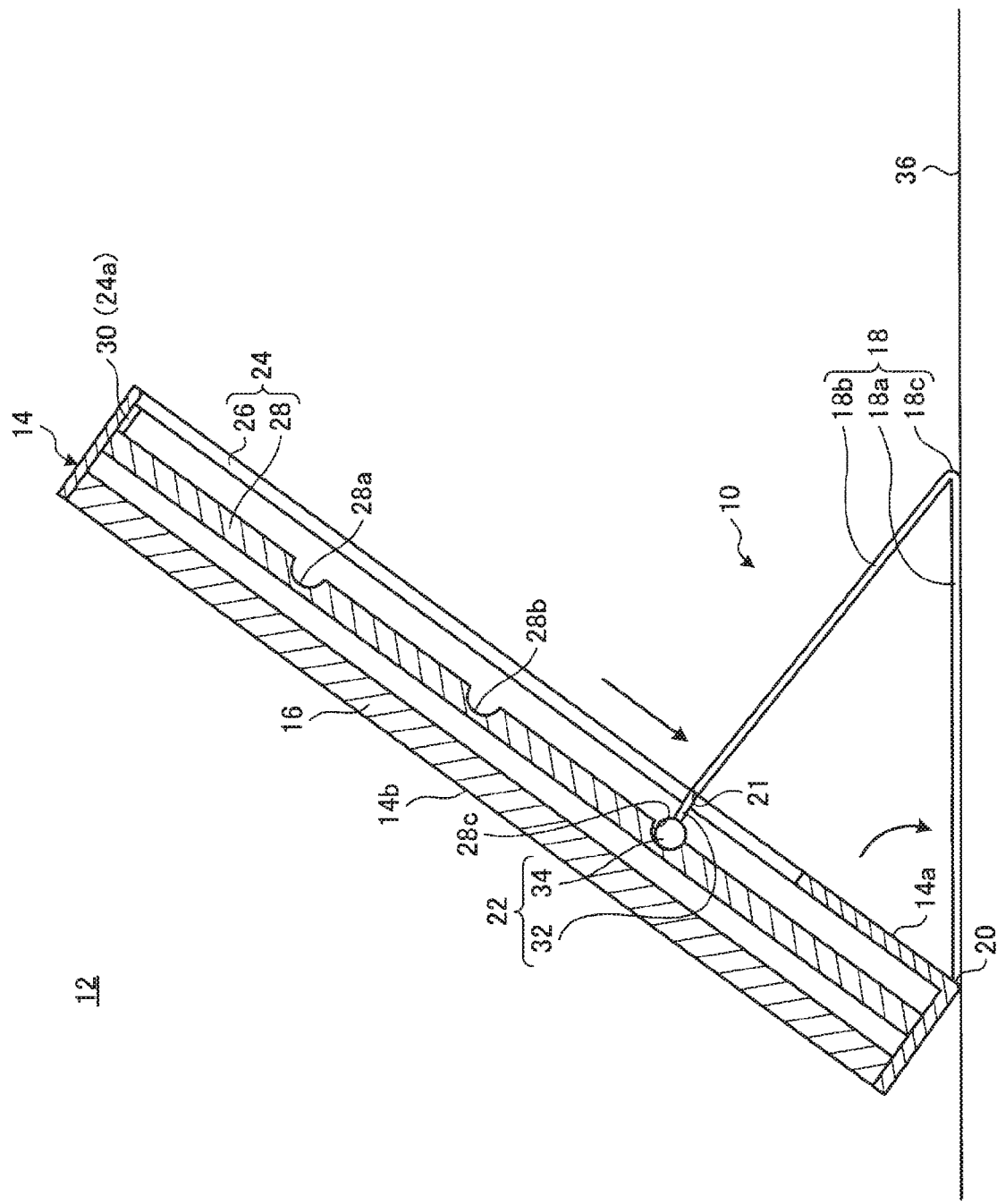
FIG. 2D is a vertical cross-sectional view of the portable information device in a state where the stand device is in an upright position at yet another predetermined angle.

For example, as illustrated in FIG. 2D, when the slide member 22 is engaged with the adjacent engaging portion 28*c* from the engaging portion 28*b*, the stand plate 18 comes to be in an upright position forming an inverted-V shape with a sharp peak in which the stand plate 18 is bent at the crease 18*c* at an angle smaller than that illustrated in FIG. 2C. At this upright position, the first plate 18*a* can be placed on the mount surface 36, as illustrated in FIG. 2D. Accordingly, the portable information device 12 stands on the mount surface 36 more steeply than that illustrated in FIG. 2C.

In returning the stand plate 18 from one of the upright positions illustrated in FIGS. 2B through 2D to the housing position illustrated in FIG. 2A, the slide member 22 is caused to slide to the terminal end 24*a* of the guide rail 24 while the inverted V-shaped stand plate 18 is pushed.

Figure 4:
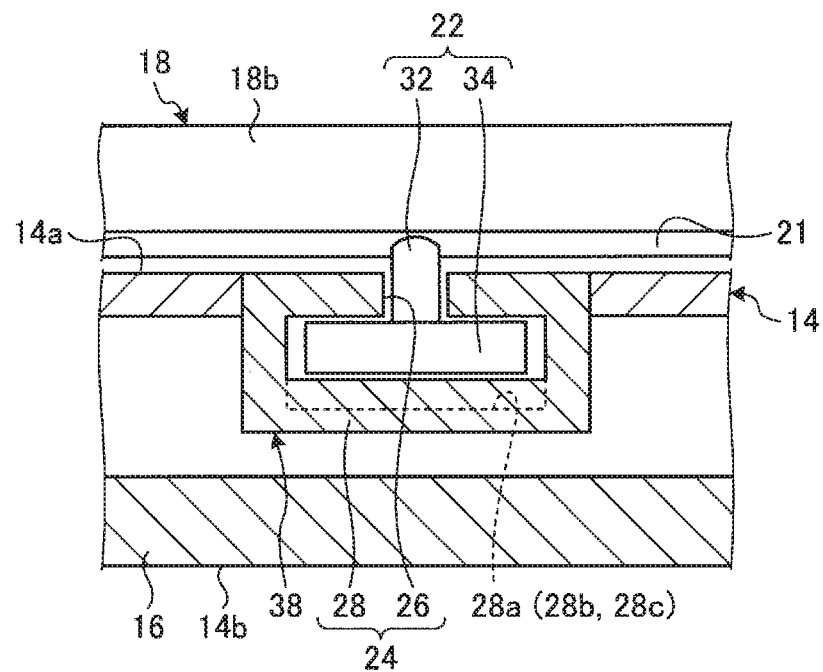
FIG. 4 is a horizontal cross-sectional view illustrating, in an enlarged manner, a main portion of a portable information device including a guide rail according to a variation.

FIG. 4 is a horizontal cross-sectional view illustrating, in an enlarged manner, a main portion of the portable information device 12 including the guide rail 24 according to a variation.

Although FIG. 3 illustrates, as an example, the guide rail 24 configured such that the rail part 28 is disposed inside the long hole 26 formed in the chassis 14, the long hole 26 and the rail part 28 may be integrally formed in the guide rail 24 as illustrated in FIG. 4. The guide rail 24 illustrated in FIG. 4 is configured such that the long hole 26 and the rail part 28 are formed in a hard rail member 38 made of a resin or a metal. The rail member 38 is buried in a recess or a hole formed in the chassis 14.

Figure 5:
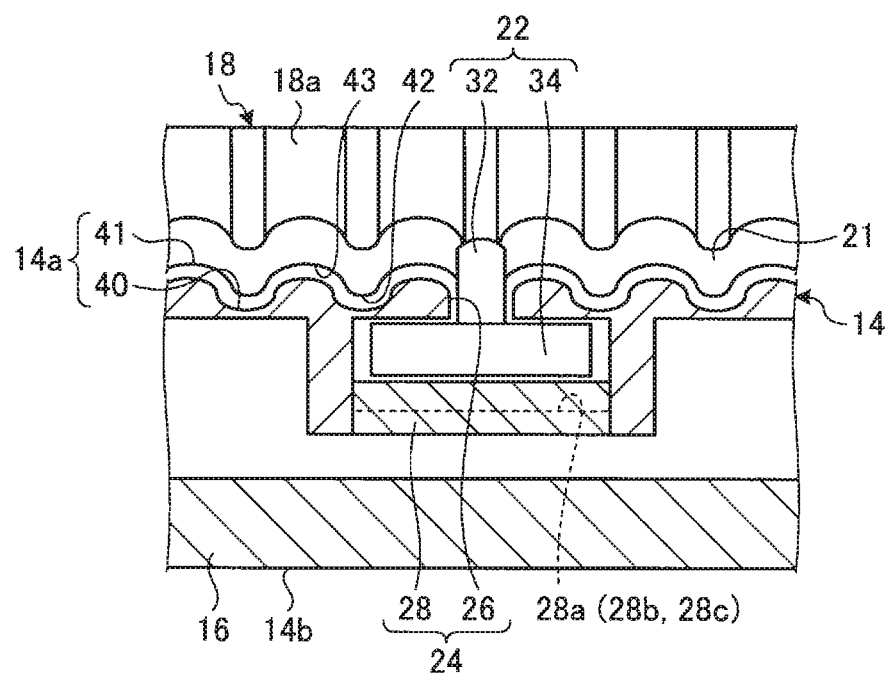
FIG. 5 is a horizontal cross-sectional view illustrating, in an enlarged manner, a main portion of a portable information device including a chassis according to a variation.

FIG. 5 is a horizontal cross-sectional view illustrating, in an enlarged manner, a main portion of the portable information device 12 including the chassis 14 according to a variation.

As illustrated in FIG. 5, on the back surface 14a of the chassis 14, a plurality of recesses (concave portions) 40 and a plurality of projections (convex portions) 41 each formed along a direction in which the guide rail 24 extends may be arranged in a direction orthogonal to the direction in which the guide rail 24 extends. That is, the back surface 14a has a vertically striped pleat pattern constituted by the recesses 40 and the projections 41. The long hole 26 constituting the guide rail 24 is formed along the recesses 40. In this manner, the long hole 26 can be made inconspicuous on the back surface 14a of the chassis 14 so that outer appearance of the portable information device 12 can be enhanced. In addition, the pleat pattern on the back surface 14a of the chassis 14 enables a user to easily grip the back surface 14a with a hand, and increases heat dissipation and strength.

Furthermore, projections 42 and recesses 43 to be respectively engaged with the recesses 40 and the projections 41 may also be provided on each surface or a surface facing the back surface 14a of the stand plate 18. In this manner, the projections 42 and the recesses 43 of the stand plate 18 are engaged with the recesses 40 and the projections 41 on the back surface 14a so that rising or displacement of the stand plate 18 can be reduced. In addition, the stand plate 18 can be made thin and strength of the stand plate 18 can be increased.

Figure 6:
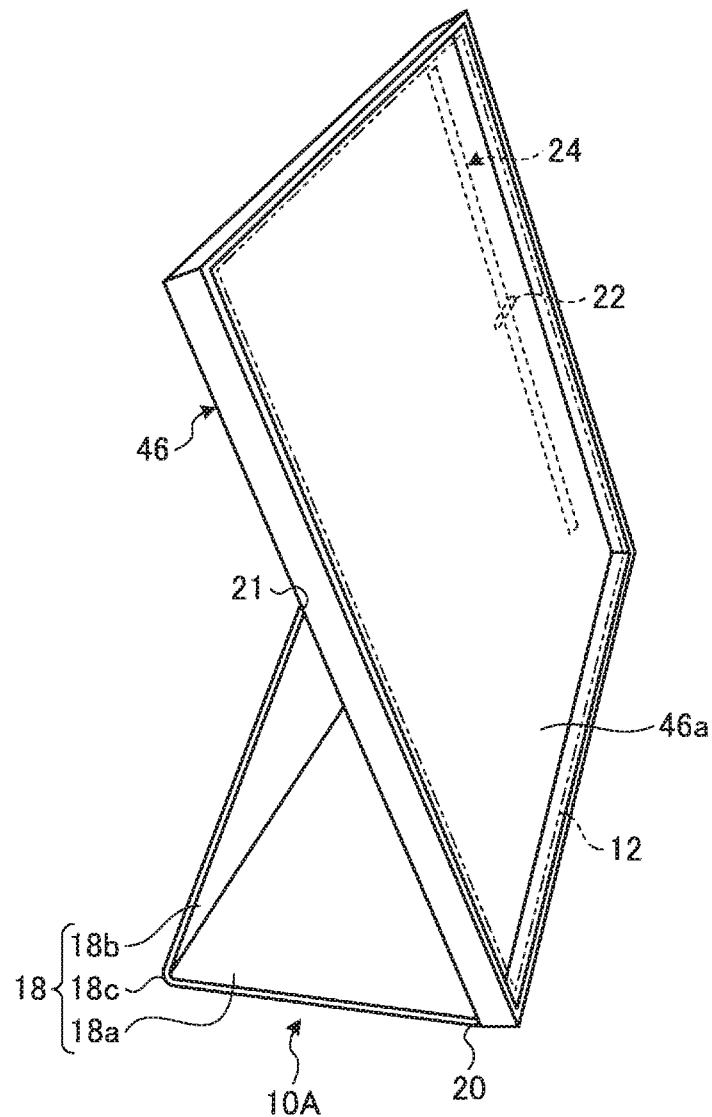
FIG. 6 is a perspective view schematically illustrating a stand device according to a variation.

FIG. 6 is a perspective view schematically illustrating a stand device 10A according to a variation.

In the examples of the configuration described above, the guide rail 24 is directly disposed on the chassis 14 of the portable information device 12, and the first end 20 of the stand plate 18 is directly attached to the edge of the chassis 14. Alternatively, the stand device 10 may be configured as the stand device 10A separated from the chassis 14 of the portable information device 12.

As illustrated in FIG. 6, the stand device 10A includes an attachment plate 46 that can be removably attached to the back surface (of the chassis 14) of the portable information device 12. The attachment plate 46 has, on the surface thereof, a housing recess 46a having a rectangular shape in which the portable information device 12 of a general plate shape can be removably fitted, for example, having a shape formed when the stand device 10 is removed from the portable information device 12 illustrated in FIG. 1. Instead of the configuration including the housing recess 46a, the attachment plate 46 may have a configuration in which the attachment plate 46 is constituted by a single flat plate whose surface is provided with a magnet, a holding band, or the like that can hold the portable information device 12, for example. The guide rail 24 is disposed on the back surface of the attachment plate 46, and the first end 20 of the stand plate 18 is attached to an edge of the back surface of the attachment plate 46. In this manner, in the case of the stand device 10A, when the portable information device 12 is mounted on the attachment plate 46, the guide rail 24 and the stand plate 18 are disposed at the back surface 14a, and the first end 20 is attached to the chassis 14 through the attachment plate 46 such that the stand device 10A is bendable.

In the stand device 10A having the configuration described above, when the portable information device 12 is mounted on the attachment plate 46, functions similar to those of the stand device 10 integrally provided with the portable information device 12 illustrated in FIG. 1 can be obtained.

As described above, the stand device 10 (10A) according to the embodiment includes: the guide rail 24 facing the back surface 14a of the chassis 14 of the portable information device 12; and the stand plate 18 having the first end 20 that is attached to the chassis 14 in such a manner that the stand plate 18 is bendable and having the second end 21 opposite to the first end 20, the slide member 22 is disposed at the second end 21 and is slidably engaged with the guide rail 24, the stand plate 18 includes the crease 18c that extends in a direction intersecting a direction in which the guide rail 24 extends and is disposed between the first end 20 and the second end 21 so that when the slide member 22 slides along the guide rail 24, the stand plate 18 is bent at the crease 18c and is brought into contact with or separated from the back surface 14a of the chassis 14.

As described above, in the stand device 10 (10A), the stand plate 18 is bent at the crease 18c, and the slide member 22 is caused to slide along the guide rail 24 to be disposed at a predetermined position so that the portable information device 12 can stand and be held in a predetermined angular position. Thus, it is unnecessary to apply a large torque to the crease 18c of the stand plate 18 or a portion serving as a hinge to the chassis 14. In addition, a change in the bending angle of the stand plate 18 caused by sliding of the slide member 22 can be easily grasped. As a result, the stand device 10 (10A) enables the portable information device 12 to be easily and smoothly set at a desired upright angle.

As described above, the guide rail 24 is disposed near a side of the chassis 14 of the portable information device 12. That is, the portable information device 12 houses a large electronic component or the like especially near a center part thereof in many cases. In view of this, the guide rail 24 that needs a certain depth is provided on a side portion of the chassis 14 so that an installation space for the guide rail 24 can be easily obtained. In addition, since the guide rail 24 is provided on the side portion of the chassis 14, the slide member 22 that slides on the guide rail 24 is also disposed on the side portion of the chassis 14. Accordingly, operability in operation by gripping the side of the stand plate 18 with a hand can be enhanced.

The present invention is not limited to the embodiment described above, and can be, of course, freely changed without departing from the gist of the invention.

The invention claimed is:

1. A stand device capable of holding a portable information device in an upright position, the stand device comprising:
 a guide rail facing a back surface of a chassis of the portable information device; and
 a stand plate having a first end that is attached to the chassis in such a manner that the stand plate is bendable and having a second end opposite to the first end, a slide member being disposed at the second end and being slidably engaged with the guide rail, the stand plate including a crease that extends in a direction intersecting a direction in which the guide rail extends and is disposed between the first end and the second end so that, when the slide member slides along the guide rail, the stand plate is bent at the crease and is brought into contact with or separated from the back surface of the chassis.

2. The stand device according to claim 1, wherein:
a plurality of engaging portions capable of being engaged with the slide member, at predetermined slide member positions, at a plurality of locations in a longitudinal direction of the guide rail.

3. The stand device according to claim 1, wherein:
when the slide member is disposed at a terminal end of the guide rail corresponding to the second end of the stand plate, the stand plate is in a planar shape along the back surface of the chassis.

4. The stand device according to claim 3, further comprising:
a holding unit, capable of holding the slide member, is disposed at the terminal end of the guide rail.

5. The stand device according to claim 1, wherein:
the guide rail includes a long hole facing the back surface of the chassis and a rail part which is disposed in the long hole and on which the slide member slides, and
the slide member includes a shaft part penetrating the long hole and a slide piece slidably engaged with an edge of the long hole in which the slide piece is slidable on the rail part.

6. The stand device according to claim 1, further comprising
an attachment plate that is removably attached to the back surface of the chassis of the portable information device,
wherein the guide rail is disposed on the attachment plate, and
wherein the first end of the stand plate is attached to an edge of the attachment plate.

7. A stand-equipped portable information device, comprising:
a stand device including:
a guide rail facing a back surface of a chassis of the portable information device; and
a stand plate having a first end that is attached to the chassis in such a manner that the stand plate is bendable and having a second end opposite to the first end, a slide member being disposed at the second end and being slidably engaged with the guide rail, the stand plate including a crease that extends in a direction intersecting a direction in which the guide rail extends and is disposed between the first end and the second end so that, when the slide member slides along the guide rail, the stand plate is bent at the crease and is brought into contact with or separated from the back surface of the chassis; and
the portable information device.

8. A stand-equipped portable information device comprising:
a stand device including:
a guide rail facing a back surface of a chassis of the portable information device; and
a stand plate having a first end that is attached to the chassis in such a manner that the stand plate is bendable and having a second end opposite to the first end, a slide member being disposed at the second end and being slidably engaged with the guide rail, the stand plate including a crease that extends in a direction intersecting a direction in which the guide rail extends and is disposed between the first end and the second end so that, when the slide member slides along the guide rail, the stand plate is bent at the crease and is brought into contact with or separated from the back surface of the chassis;
the portable information device, wherein:
the guide rail faces the back surface of the chassis of the portable information device, and
the first end of the stand plate is attached to an edge of the chassis.

9. The stand-equipped portable information device according to claim 8, wherein:
a plurality of recesses and a plurality of projections each extending along a direction in which the guide rail extends are arranged on the back surface of the chassis of the portable information device in a direction orthogonal to the direction in which the guide rail extends, and
the guide rail is disposed along the recesses.

* * * * *